(12) United States Patent
Song et al.

(10) Patent No.: US 9,513,161 B2
(45) Date of Patent: Dec. 6, 2016

(54) IMAGE SENSING DEVICE

(71) Applicant: SK hynix Inc., Gyeonggi-do (KR)

(72) Inventors: Jung-Eun Song, Gyeonggi-do (KR); Si-Wook Yoo, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 14/836,619

(22) Filed: Aug. 26, 2015

(65) Prior Publication Data

US 2016/0290860 A1 Oct. 6, 2016

(30) Foreign Application Priority Data

Mar. 31, 2015 (KR) ........................ 10-2015-0045058

(51) Int. Cl.
*H04N 5/374* (2011.01)
*G01J 1/42* (2006.01)
*H04N 5/376* (2011.01)
*G01J 1/44* (2006.01)

(52) U.S. Cl.
CPC ................ *G01J 1/4228* (2013.01); *G01J 1/44* (2013.01); *H04N 5/3765* (2013.01)

(58) Field of Classification Search
CPC ......... G01J 1/4228; G01J 1/44; H04N 5/3765; H04N 5/374
See application file for complete search history.

(56) References Cited

U.S. PATENT DOCUMENTS

| 2007/0109434 A1* | 5/2007 | Puchades | ............... | H04N 3/155 |
| | | | | 348/294 |
| 2011/0279723 A1* | 11/2011 | Takamiya | ........... | H03M 1/0612 |
| | | | | 348/308 |

FOREIGN PATENT DOCUMENTS

KR 1020120059713 6/2012

* cited by examiner

*Primary Examiner* — Tuan Ho
(74) *Attorney, Agent, or Firm* — IP & T Group LLP

(57) ABSTRACT

An image sensing device includes a ramp voltage generation block suitable for generating a ramp voltage adjusted by a predetermined voltage in each predetermined cycle, based on a bias signal and a plurality of first ramp control signals; and a ramp voltage correction block suitable for correcting the ramp voltage in each predetermined cycle based on the bias signal and at least one second ramp control signal.

19 Claims, 7 Drawing Sheets

IMAGE SENSING DEVICE

CROSS-REFERENCE TO RELATED APPLICATION

This application claims priority under 35 U.S.C. §119 to Korean Patent Application No. 10-2015-0045058 filed on Mar. 31, 2015 in the Korean Intellectual Property Office, the disclosure of which is incorporated herein by reference in its entirety.

TECHNICAL FIELD

Various embodiments relate to an electronic circuit design technology, and more particularly, to an image sensing device.

DISCUSSION OF THE RELATED ART

Image sensing devices capture images by using semiconductor properties that react to light. Image sensing devices can be divided into charge coupled device (CCD) image sensors and complementary metal oxide semiconductor (CMOS) image sensors. Image sensing devices using CMOS technology (i.e., CMOS image sensors) have an advantage in that their analog and digital control circuits can be formed on one integrated circuit (IC).

Image sensing devices include analog-to-digital converters (ADCs) for converting analog signals from pixels into digital signals. The analog-to-digital converters include a detection block for detecting voltage levels of the analog signal based on a ramp voltage. The detection block may include an amplifier circuit for comparing the voltage of the analog signal with the ramp voltage to output a comparison result.

The ramp voltage has a waveform that falls (or rises) in each cycle of a clock signal, and is used as a reference voltage when detecting the voltage level of the analog signal. The slope of the ramp voltage may be adjusted to control an analog gain. The analog gain should be adjusted according to the intensity of light incident on the image sensing device. For example, the lower the light intensity, the more the analog gain is to be increased.

Recently, image sensing devices have been adopting technologies for shortening the operation time of the analog-to-digital conversion. Image sensing devices adopt a 2-step analog-to-digital converter which is developed from a single-slope analog-to-digital converter. When assuming that 10-bit digital signals are outputted, the single-slope analog-to-digital converter needs a fine clock signal of 1024 (i.e., 2^10) cycles and a fine ramp voltage to output the 10-bit digital signals, whereas the 2-step analog-to-digital converter outputs 3-bit digital signals of the 10-bit digital signals by using a coarse clock signal and a coarse ramp voltage, and outputs the remaining 7-bit digital signals of the 10-bit digital signals by using a fine clock signal and a fine ramp voltage, thereby requiring 136 (2^3+2^7) cycles of the clock signals including the fine clock signal and the coarse clock signal.

The fine ramp voltage falls (or rises) by a predetermined voltage level in each cycle of the fine clock signal. For example, the fine ramp voltage falls (or rises) by a voltage level corresponding to '1LSB (least significant bit)'. The coarse ramp voltage falls (or rises) by a predetermined voltage level in each cycle of the coarse clock signal. For example, the coarse ramp voltage falls (or rises) by a voltage level corresponding to '128LSB'.

FIG. 1 is a diagram illustrating a waveform of a coarse ramp voltage generated by a conventional image sensing device.

Referring to FIG. 1, a ramp voltage VRAMP falls by a predetermined voltage level in each cycle of a clock signal (not shown). A ramp slope of the ramp voltage VRAMP may be adjusted to control the analog gain. For example, when the ramp slope of the ramp voltage VRAMP is gentle, the analog gain may be increased, and when the ramp slope of the ramp voltage VRAMP is steep, the analog gain may be decreased.

While it is ideal for the ramp voltage VRAMP to have the waveform shown by the dotted lines regardless of the analog gain, the waveform shown by the solid lines is more typical in actuality. This may result from the performance of a circuit which generates the ramp voltage VRAMP, and/or loading of a parasitic capacitor coupled to a metal line for supplying the ramp voltage VRAMP.

In this case, the settling time T1 may be lengthened when the ramp voltage VRAMP falls by the predetermined voltage level. Such concerns may be more prevalent in the coarse ramp voltage than in the fine ramp voltage,

SUMMARY

Various embodiments are directed to an image sensing device capable of minimizing the settling time of a ramp voltage and controlling the settling time to be substantially constant, according to an analog gain.

In an embodiment, an image sensing device may include: a ramp voltage generation block suitable for generating a ramp voltage adjusted by a predetermined voltage in each predetermined cycle, based on a bias signal and a plurality of first ramp control signals; and a ramp voltage correction block suitable for correcting the ramp voltage in each predetermined cycle based on the bias signal and at least one second ramp control signal.

The ramp voltage correction block may drive an output terminal of the ramp voltage with a driving force corresponding to the bias signal during an initial period in each predetermined cycle.

The image sensing device may further include: a detection block suitable for detecting a voltage of a pixel signal based on the ramp voltage; and a bias signal generation block suitable for generating the bias signal, and adjusting a voltage of the bias signal based on a gain code corresponding to an analog gain.

The ramp voltage generation block may include: a plurality of first driving units suitable for driving a plurality of first nodes with high voltage based on the bias signal; a plurality of first switching units coupled between the first nodes and an output terminal of the ramp voltage, and suitable for being sequentially switched in each predetermined cycle based on the first ramp control signals; and a resistance unit coupled between the output terminal of the ramp voltage and a low voltage terminal.

The ramp voltage correction block may include: at least one second driving unit suitable for driving at least one second node with high voltage based on the bias signal; and at least one second switching unit coupled between the at least one second node and the output terminal of the ramp voltage, and suitable for being switched with a specific state in each predetermined cycle based on the at least one second ramp control signal.

The image sensing device may further include: a first ramp voltage control block suitable for generating the first ramp control signals based on a clock signal with the predetermined cycle; and a second ramp voltage control block suitable for generating the at least one second ramp control signal based on the clock signal.

The second ramp voltage control block may include: a storage unit suitable for storing a switching control signal for controlling whether to switch the at least one second switching unit; and a control unit suitable for generating the at least one second ramp control signal which is activated or deactivated during only the initial period in each predetermined cycle based on the clock signal and the switching control signal, In an embodiment, an image sensing device may include: a detection block suitable for detecting a voltage of a pixel signal based on a ramp voltage; a bias signal generation block suitable for generating a first bias signal, and a second bias signal, wherein the first bias signal has a voltage adjusted based on a gain code corresponding to an analog gain, and the second bias signal has a constant voltage regardless of the gain code; a first ramp voltage control block suitable for generating a plurality of first ramp control signals based on a clock signal with a predetermined cycle; a second ramp voltage control block suitable for generating a plurality of second ramp control signals based on the gain code and the clock signal; a ramp voltage generation block suitable for generating the ramp voltage having a voltage adjusted by a predetermined voltage in each predetermined cycle, based on the first bias signal and the first ramp control signals; and a ramp voltage correction block suitable for correcting the ramp voltage in each predetermined cycle based on the second bias signal and the second ramp control signals, The second ramp voltage control block may activate some or all of the second ramp control signals during only an initial period in each predetermined cycle based on the gain code and the clock signal.

The ramp voltage correction block may drive an output terminal of the ramp voltage with a predetermined driving force during the initial period in each predetermined cycle.

The ramp voltage generation block may include: a plurality of first driving units suitable for driving a plurality of first nodes with high voltage based on the first bias signal; a plurality of first switching units coupled between the first nodes and an output terminal of the ramp voltage, and suitable for being sequentially switched in each predetermined cycle based on the first ramp control signals; and a resistance unit coupled between the output terminal of the ramp voltage and a low voltage terminal.

The ramp voltage correction block may include: a plurality of second driving units suitable for driving a plurality of second nodes with high voltage based on the second bias signal; and a plurality of second switching units coupled between the second nodes and the output terminal of the ramp voltage, and suitable for being variously switched according to the analog gain, based on the second ramp control signals.

The second switching units may be switched according to the analog gain, and, according to such switching, some or all of the second switching units may be switched with a specific state in each predetermined cycle.

The second ramp voltage control block may include: a switching control unit suitable for generating switching control signal's for controlling whether to switch the second switching units, based on the gain code; and a control unit suitable for activating some or all of the second ramp control signals during only the initial period in each predetermined cycle, based on the clock signal and the switching control signals.

In an embodiment, an image sensing device may include: a detection block suitable for detecting a voltage of a pixel signal based on a ramp voltage; a bias signal generation block suitable for generating a bias signal having a voltage adjusted based on a gain code corresponding to an analog gain; a first ramp voltage control block suitable for generating a plurality of first ramp control signals based on a clock signal with a predetermined cycle; a second ramp voltage control block suitable for generating at least one second ramp control signal which is activated or deactivated during only an initial period in each predetermined cycle, based on the clock signal, and controlling a pulse width of the at least one second ramp control signal based on the gain code; a ramp voltage generation block suitable for generating the ramp voltage that is adjusted by a predetermined voltage in each predetermined cycle, based on the bias signal and the first ramp control signals; and a ramp voltage correction block suitable for correcting the ramp voltage in each predetermined cycle based on the bias signal and the at least one second ramp control signal.

The ramp voltage correction block drives an output terminal of the ramp voltage with a predetermined driving force during the initial period in each predetermined cycle.

The ramp voltage generation block may include: a plurality of first driving units suitable for driving a plurality of first nodes with high voltage based on the bias signal; a plurality of first switching units coupled between the first nodes and an output terminal of the ramp voltage, and suitable for being sequentially switched in each predetermined cycle based on the first ramp control signals; and a resistance unit coupled between the output terminal of the ramp voltage and a low voltage terminal.

The ramp voltage correction block may include: at least one second driving unit suitable for driving at least one second node with high voltage based on the bias signal; and at least one second switching unit coupled between the at least one second node and the output terminal of the ramp voltage, and suitable for being switched with a specific state in each predetermined cycle based on the at least one second ramp control signal.

The second ramp voltage control block may include: a storage unit suitable for storing a switching control signal for controlling whether to switch the at least one second switching unit; and a control unit suitable for generating the at least one second ramp control signal which is activated or deactivated during only the initial period in each predetermined cycle, based on the clock signal and the switching control signal, and controlling a pulse width of the at least one second ramp control signal based on the gain code.

BRIEF DESCRIPTION OF THE DRAWINGS

FIG. 5 is a diagram illustrating a waveform of a ramp voltage generated by the image sensing device shown in FIG. 2.

DETAILED DESCRIPTION

Figure 1:
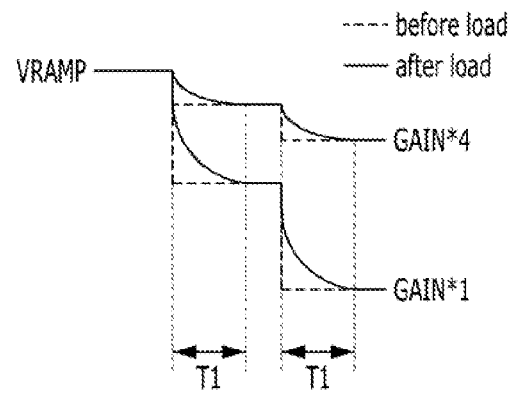
FIG. 1 is a diagram illustrating waveforms of a ramp voltage generated by a conventional image sensing device.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts in the various figures and embodiments of the present invention.

The drawings are not necessarily to scale and, in some instances, proportions may have been exaggerated to clearly illustrate features of the embodiments. It is also noted that in this specification, "connected/coupled" refers to one component not only directly coupling another component, but also indirectly coupling another component through an intermediate component. In addition, a singular form may include a plural form as long as it is not specifically mentioned.

Figure 2:
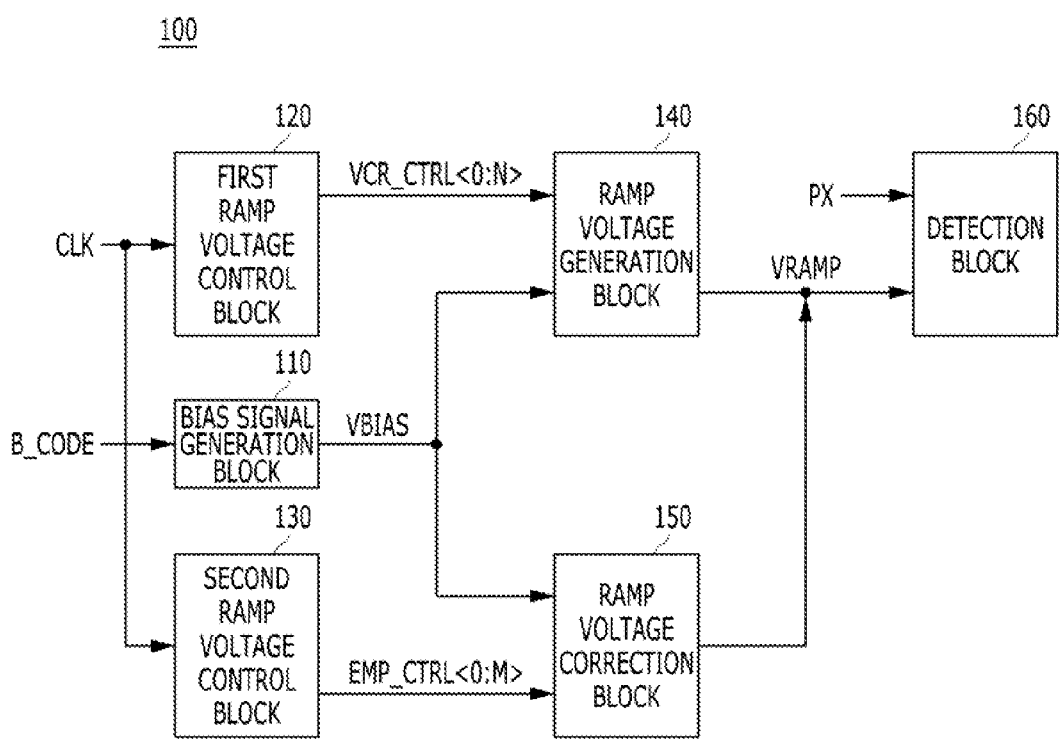
FIG. 2 is a block diagram illustrating an image sensing device in accordance with an embodiment of the present invention.

FIG. 2 is a block diagram illustrating an image sensing device 100 in accordance with an embodiment of the present invention.

Referring to FIG. 2, the image sensing device 100 may include a bias signal generation block 110, a first ramp voltage control block 120, a second ramp voltage control block 130, a ramp voltage generation block 140, a ramp voltage correction block 150, and a detection block 160, The bias signal generation block 110 may generate a bias signal VBIAS which is adjusted in the voltage level thereof in response to a gain code B_CODE corresponding to an analog gain. For example, the bias signal generation block 110 may generate the bias signal VBIAS of a voltage level inversely proportional to the analog gain.

The first ramp voltage control block 120 may generate a plurality of first ramp control signals VCR_CTRL<0:N> in response to a clock signal CLK with a predetermined cycle. For example, the first ramp voltage control block 120 may deactivate any one of the first ramp control signals VCR_CTRL<0:N> in each predetermined cycle. In other words, the first ramp voltage control block 120 may sequentially deactivate the first ramp control signals VCR_CTRL<0:N> In each predetermined cycle.

The second ramp voltage control block 130 may generate a plurality of second ramp control signals EMP_CTRL<0:M> in response to the clock signal CLK. For example, the second ramp voltage control block 130 may deactivate at least one among the second ramp control signals EMP_CTRL<0:M> during an initial period in each predetermined cycle.

The ramp voltage generation block 140 may generate a ramp voltage VRAMP which ramps with a predetermined slope, in response to the bias signal VBIAS and the first ramp control signals VCR_CTRL<0:N>. That is to say, the ramp voltage generation block 140 may generate the ramp voltage VRAMP which is adjusted by a unit voltage level corresponding to the analog gain in each predetermined cycle. For example, the ramp voltage generation block 140 may generate the ramp voltage VRAMP which falls by the unit voltage level in each predetermined cycle.

The ramp voltage correction block 150 may correct the ramp voltage VRAMP in each predetermined cycle in response to the bias signal VBIAS and the second ramp control signals EMP_CTRL<0:M>. For example, the ramp voltage correction block 150 may drive the output terminal of the ramp voltage VRAMP with a driving force corresponding to the analog gain during the initial period in each predetermined cycle.

The detection block 160 may detect the voltage level of a pixel signal PX based on the ramp voltage VRAMP. For example, the detection block 160 may be an amplifier circuit which is included an analog-to-digital converter, and the amplifier circuit may compare the voltage levels of the ramp voltage VRAMP and the pixel signal PX to output a comparison result.

Figure 3:
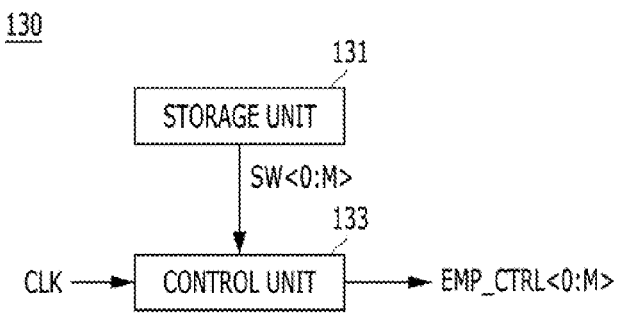
FIG. 3 is a detailed diagram of a second ramp voltage control block shown in FIG. 2.

FIG. 3 is a detailed diagram the second ramp voltage control block 130 shown in FIG. 2.

Referring to FIG. 3, the second ramp voltage control block 130 may include a storage unit 131 and a control unit 133.

The storage unit 131 may store a plurality of switching control signals SW<0:M> for controlling whether to switch a plurality of second switching units SSW0 to SSWM which will be described below. For example, the storage unit 131 may include a register, a one-time programmable (OTP) circuit, or the like. The logic states of the switching control signals SW<0:M> may be determined in advance. The switching control signals SW<0:M> of which logic states are determined may be stored in advance in the storage unit 131.

The control unit 133 may generate the second ramp control signals EMP_CTRL<0:M> in response to the clock signal CLK and the switching control signals SW<0:M>. For example, the control unit 133 may deactivate at least one of the second ramp control signals EMP_CTRL<0:M> during the initial period in each predetermined cycle.

Figure 4:
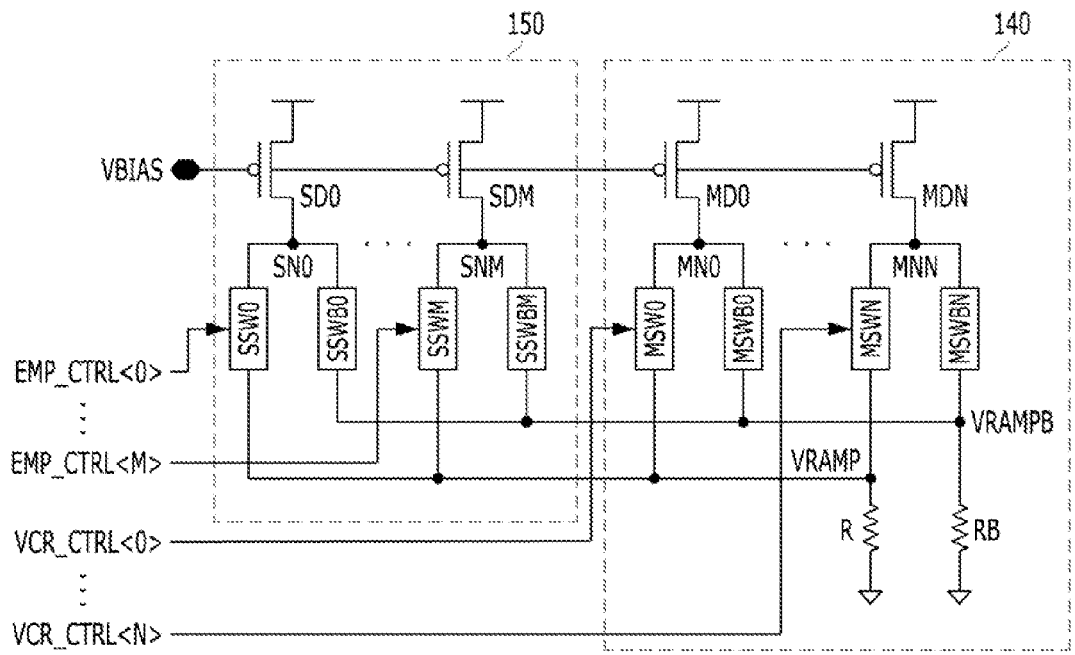
FIG. 4 is a detailed diagram of a ramp voltage generation block and a ramp voltage correction block shown in FIG. 2.

FIG. 4 is a detailed diagram of the ramp voltage generation block 140 and the ramp voltage correction block 150 shown in FIG. 2.

Referring to FIG. 4, the ramp voltage generation block 140 may include a plurality of first driving units MD0 to MDN, a plurality of first switching units MSW0 to MSWN, a plurality of first complementary switching units MSWB0 to MSWBN, a first resistance unit R, and a second resistance unit RB.

The first complementary switching units MSWB0 to MSWBN and the second resistance unit RB may be components for generating a ramp bar voltage VRAMPB which is in a complementary relationship with the ramp voltage VRAMP. Hereinafter, for the sake of convenience in explanation, descriptions for the first complementary switching units MSWB0 to MSWBN and the second resistance unit RB will be omitted, and descriptions will be made for only the first driving units MD0 to MDN, the first switching units MSW0 to MSWN, and the first resistance unit R.

The first driving units MD0 to MDN may drive a plurality of first nodes MN0 to MNN with a high voltage (e.g., a power supply voltage) in response to the bias signal VBIAS. In particular, the first driving units MD0 to MDN may respectively provide unit main current corresponding to the analog gain to the respective first nodes MN0 to MNN according to the voltage level of the bias signal VBIAS. For example, the first driving units MD0 to MDN may include PMOS transistors having gates which are coupled to the input terminal of the bias signal VBIAS and sources and drains which are coupled between the terminal of the high voltage and the respective first nodes MN0 to MNN.

The first switching units MSW0 to MSWN may be coupled between the first nodes MN0 to MNN and the output terminal of the ramp voltage VRAMP. The first switching units MSW0 to MSWN may be sequentially switched in each predetermined cycle in response to the first ramp control signals VCR_CTRL<0:N>. For example, all of the first switching units MSW0 to MSWN may be shorted during a first cycle, N number of first switching units MSW1 to MSWN may be shorted and only the remaining first switching unit MSW0 may be opened during a second cycle. Further, only one first switching unit MSWN may be shorted and the remaining N number of first switching units MSW0 to MSWN−1 may be opened during a last (N+1)th cycle.

The first resistance unit R may be coupled between the output terminal of the ramp voltage VRAMP and the terminal of a low voltage (e.g., a ground voltage).

The ramp voltage correction block 150 may include a plurality of second driving units SD0 to SDM, a plurality of second switching units SSW0 to SSWM, and a plurality of second complementary switching units SSWB0 to SSWBM.

The second complementary switching units SSWB0 to SSWBM may be components for correcting the ramp bar voltage VRAMPB. Hereinafter, for the sake of convenience in explanation, descriptions for the second complementary switching units SSWB0 to SSWBM will be omitted, and descriptions will be made for only the second driving units SD0 to SDM and the second switching units SSW0 to SSWM The second driving units SD0 to SDM may drive a plurality of second nodes SN0 to SNM with the high voltage in response to the bias signal VBIAS. In particular the second driving units SD0 to SDM may respectively provide unit sub current corresponding to the analog gain to the respective second nodes SN0 to SNM according to the voltage level of the bias signal VBIAS. For example, the second driving units SD0 to SDM may include PMOS transistors having gates which are coupled to the input terminal of the bias signal VBIAS and sources and drains which are coupled between the terminal of the high voltage and the respective second nodes SN0 to SNM.

The second switching units SSW0 to SSWM may be coupled between the second nodes SN0 to SNM and the output terminal of the ramp voltage VRAMP. The second switching units SSW0 to SSWM may be switched with a specific state during the initial period in each predetermined cycle in response to the second ramp control signals EMP_CTRL<0:M>. For example, some of the second switching units SSW0 to SSWM may be opened during the initial period in each predetermined cycle, and the remainder of the second switching units SSW0 to SSWM may be continuously shorted in each predetermined cycle.

Figure 5:
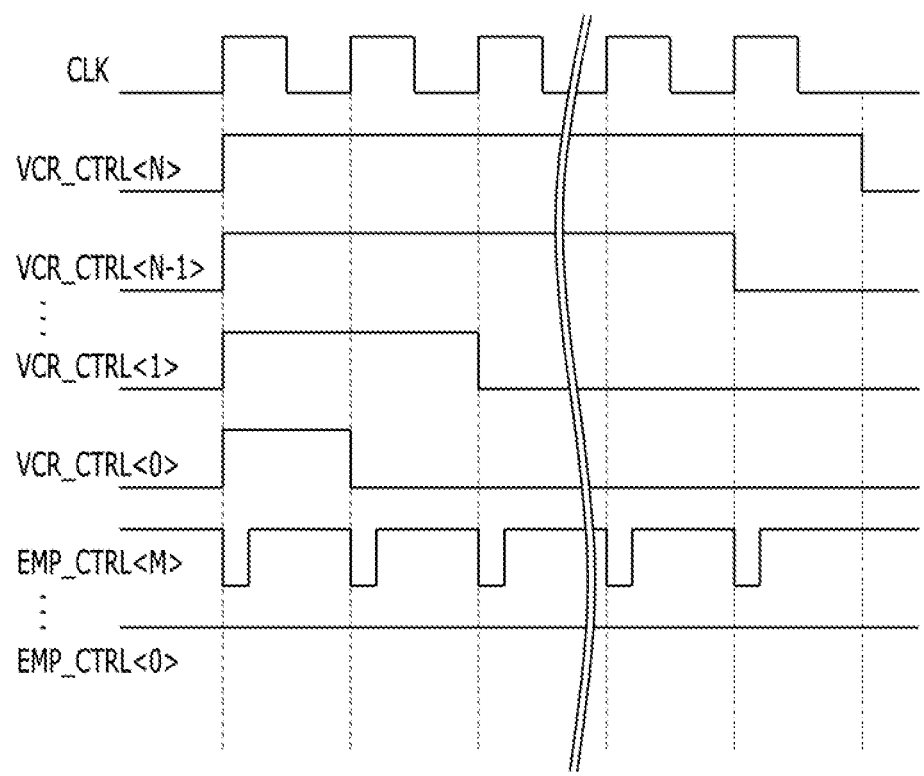
FIG. 5 is a timing diagram for describing an operation of the image sensing device shown in FIG. 2.
Figure 6:
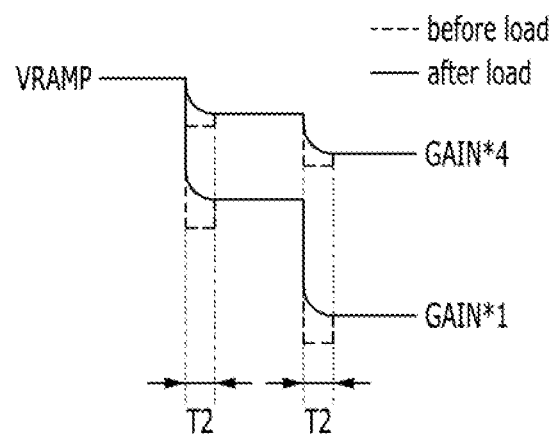

FIG. 5 is a timing diagram for describing an operation of the image sensing device 100 shown in FIG. 2, and FIG. 6 is a diagram illustrating a waveform of the ramp voltage VRAMP generated by the image sensing device 100 shown in FIG. 2.

The switching control signals SW<0:M> for controlling whether to switch the second switching units SSW0 to SSWM may be stored in the storage unit 131. The switching control signals SW<0:M> may one-to-one correspond to the second switching units SSW0 to SSWM. The switching control signals SW<0:M> as signals for selecting at least one second switching unit to be shorted among the second switching units SSW0 to SSM may be set in advance according to design. In the following, it will be described as an example that only one switching control signal SW<M> is deactivated among the switching control signals SW<0:M>.

Referring to FIG. 5, the first ramp voltage control block 120 may generate the first ramp control signals VCR_CTRL<0:N> which are sequentially deactivated one by one in each predetermined cycle in response to the clock signal CLK. For example, the first ramp in voltage control block 120 may activate all the first ramp control signals VCR_CTRL<0:N> during the first cycle of the clock signal CLK. Further, the first ramp voltage control block 120 may activate N number of first ramp control signals VCR_CTRL<1:N> among the first ramp control signals VCR_CTRL<0:N> and deactivate the remaining first ramp control signal VCR_CTRL<0> during the second cycle of the clock signal CLK. Lastly, the first ramp voltage control block 120 may activate one first ramp control signal VCR_CTRL<N> among the first ramp control signals VCR_CTRL<0:N> and deactivate the remaining N number of first ramp control signals VCR_CTRL<0:N−1> during the (N+1)th cycle of the clock signal CLK.

The second ramp voltage control block 130 may generate the second ramp control signals EMP_CTRL<0:M> in response to the clock signal CLK. For example, the control unit 133 may deactivate one second ramp control signal EMP_CTRL<M> during the initial period in each predetermined cycle and continuously activate the remaining second ramp control signals EMP_CTRL<0:M−1> in response to the switching control signals SW<0:M> and the clock signal CLK.

While not shown in the drawing, the bias signal generation block 110 may generate the bias signal VBIAS which is adjusted in the voltage level thereof in response to the gain code B_CODE corresponding to the analog gain. For example, the bias signal generation block 110 may generate the bias signal VBIAS of a voltage level inversely proportional to the analog gain.

Referring to FIG. 6, the ramp voltage generation block 140 may generate the ramp voltage VRAMP which falls by a predetermined voltage level in each predetermined cycle, in response to the first ramp control signals VCR_CTRL<0:N>. The ramp voltage generation block 140 may generate the ramp voltage VRAMP which falls by the predetermined voltage level inversely proportional to the analog gain, in response to the bias signal VBIAS. Namely, the ramp voltage generation block 140 may generate the ramp voltage VRAMP which has a slope inversely proportional to the analog gain.

The ramp voltage correction block 150 may correct the ramp voltage VRAMP during the initial period in each predetermined cycle in response to the second ramp control signals EMP_CTRL<0:M>. For example, the ramp voltage correction block 150 may drive the output terminal of the ramp voltage VRAMP with a predetermined driving force during the initial period in each predetermined cycle. The predetermined driving force may be controlled according to the voltage level of the bias signal VBIAS.

That is, the ramp voltage VRAMP may be generated by the ramp voltage generation block 140 in such a pattern that the ramp voltage VRAMP falls by the predetermined voltage level in each predetermined cycles The ramp voltage VRAMP may be corrected additionally by the ramp voltage correction block 150 during the initial period in each predetermined cycle. Due to this fact, a sewing time T2 may be minimized when the ramp voltage VRAMP fails by the predetermined voltage level. In particular, since the ramp voltage VRAMP may be adjusted according to the voltage level of the bias signal VBIAS, the settling time T2 of the ramp voltage VRAMP may be kept constant even though the analog gain changes.

In the embodiment of the present invention, because a configuration in which the ramp voltage VRAMP falls was described as an example, by deactivating some or all of the second ramp control signals EMP_CTRL<0:M> during the initial period, the output terminal of the ramp voltage VRAMP may be driven with less driving force during the initial period. Conversely, in a configuration in which the ramp voltage VRAMP rises, by activating some or all of the second ramp control signals EMP_CTRL<0:M> during the initial period, the output terminal of the ramp voltage VRAMP may be driven with greater driving force during the initial period. Accordingly, the second ramp control signals EMP_CTRL<0:M> in the configuration in which the ramp voltage VRAMP rises and the second ramp control signals EMP_CTRL<0:M> in the configuration in which the ramp voltage VRAMP falls should be designed to have opposite polarities.

Figure 7:
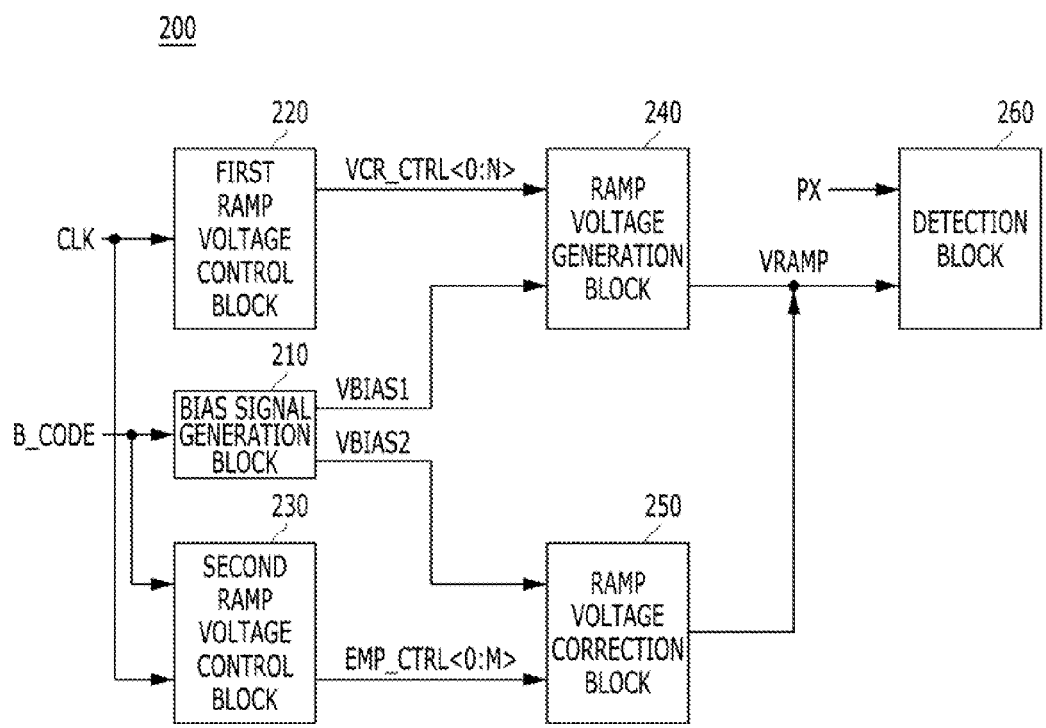
FIG. 7 is a block diagram illustrating an image sensing device in accordance with an embodiment of the present invention.

FIG. 7 is a block diagram illustrating an image sensing device 200 in accordance with an embodiment of the present invention, Referring to FIG. 7, the image sensing device 200 may include a bias signal generation block 210, a first ramp voltage control block 220, a second ramp voltage control block 230, a ramp voltage generation block 240, a ramp voltage correction block 250, and a detection block 260.

The bias signal generation block 210 may generate a first bias signal VBIAS1 which is adjusted in the voltage level thereof in response to a gain code B_CODE corresponding to the analog gain. For example, the bias signal generation block 210 may generate the first bias signal VBIAS1 of a voltage level inversely proportional to the analog gain. Also, the bias signal generation block 210 may generate a second bias signal VBIAS2 of a constant voltage level, regardless of the gain code B_CODE.

The first ramp voltage control block 220 may generate a plurality of first ramp control signals VCR_CTRL<0:N> in response to a clock signal CLK with a predetermined cycle. For example, the first ramp voltage control block 220 may activate (or deactivate) any one of the first ramp control signals VCR_CTRL<0:N> in each predetermined cycle. In other words, the first ramp voltage control block 220 may sequentially activate (or deactivate) the first ramp control signals VCR_CTRL<0:N> in each predetermined cycle.

The second ramp voltage control block 230 may generate a plurality of second ramp control signals EMP_CTRL<0:M> in response to the clock signal CLK and the gain code B_CODE. The second ramp voltage second control block 230 may deactivate at least one among the second ramp control signals EMP_CTRL<0:M> during an initial period in each predetermined cycle. In particular, the second ramp voltage control block 230 may control the number of signals to be deactivated among the second ramp control signals EMP_CTRL<0:M>, based on the analog gain.

The ramp voltage generation block 240 may generate a ramp voltage VRAMP which ramps with a predetermined slope, in response to the first bias signal VBIAS1 and the first ramp control signals VCR_CTRL<0:N>. That is to say, the ramp voltage generation block 240 may generate the ramp voltage VRAMP which is adjusted by a unit voltage level corresponding to the analog gain in each predetermined cycle. For example, the ramp voltage generation block 240 may generate the ramp voltage VRAMP which falls by the unit voltage level in each predetermined cycle.

The ramp voltage correction block 250 may correct the ramp voltage VRAMP in each predetermined cycle in response to the second bias signal VBIAS2 and the second ramp control signals EMP_CTRL<0:M>. For example, the ramp voltage correction block 250 may drive the output terminal of the ramp voltage VRAMP with a driving force corresponding to the analog gain during the initial period in each predetermined cycle.

The detection block 250 may detect the voltage level of a pixel signal PX based on the ramp voltage VRAMP. For example, the detection block 260 may be an amplifier circuit which is included an analog-to-digital converter, and the amplifier may compare the voltage levels of the ramp voltage VRAMP and the pixel signal PX to output a comparison result.

Figure 8:
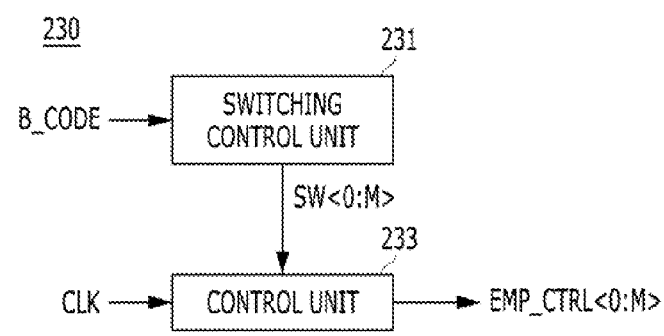
FIG. 8 is a detailed diagram of a second ramp voltage control block shown in FIG. 7.

FIG. 8 is a detailed diagram of the second ramp voltage control block 230 shown in FIG. 7.

Referring to FIG. 8, the second ramp voltage control block 230 may include a switching control unit 231 and a control unit 233.

The switching control unit 231 may generate a plurality of switching control signals SW<0:M> for controlling whether to switch a plurality of second switching units SSW0 to SSWM which will be described below, in response to the gain code B_CODE. In other words, the switching control unit 231 may control the number of signals to be activated among the switching control signals SW<0:M> based on the analog gain. For example, the switching control unit 231 may control the number of signals to be activated among the switching control signals SW<0:M>, to be inversely proportional to the analog gain.

The control unit 233 may generate the second ramp control signals EMP_CTRL<0:M> in response to the dock signal CLK and the switching control signals SW<0:M>. For example, the control unit 233 may deactivate at least one among the second ramp control signals EMP_CTRL<0:M> during the initial period in each predetermined cycle.

Figure 9:
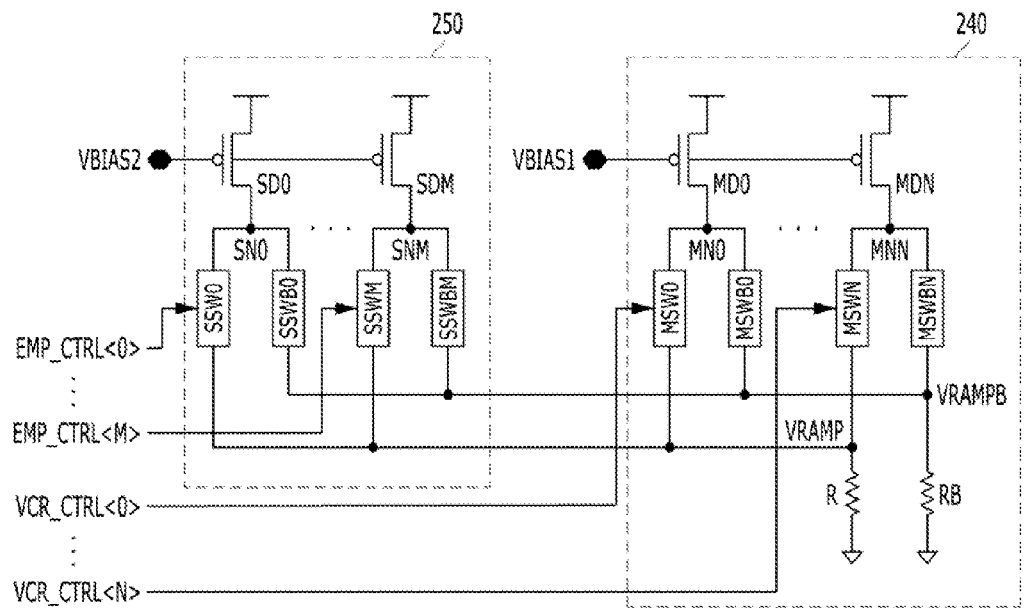
FIG. 9 is a detailed diagram of a ramp voltage generation block and a ramp voltage correction block shown in FIG. 7.

FIG. 9 is a detailed diagram of the ramp voltage generation block 240 and the ramp voltage correction block 250 shown in FIG. 7.

Referring to FIG. 9, the ramp voltage generation block 240 may include a plurality of first driving units MD0 to MDN, a plurality of first switching units MSW0 to MSWN, a plurality of first complementary switching units MSWB0 to MSWBN, a first resistance unit R, and a second resistance unit RB.

The first complementary switching units MSWB0 to MSWBN and the second resistance unit RB may be components for generating a ramp bar voltage VRAMPB which is in a complementary relationship with the ramp voltage VRAMP. Hereinafter, for the sake of convenience in explanation, descriptions for the first complementary switching units MSWB0 to MSWBN and the second resistance unit RB will be omitted, and descriptions will be made for only the first driving units MD0 to MDN, the first switching units MSW0 to MSWN and the first resistance unit R.

The first driving units MD0 to MDN may drive a plurality of first nodes MN0 to MNN with a high voltage in response to the first bias signal VBIAS1. In particular, the first driving units MD0 to MDN may respectively provide unit main current corresponding to the analog gain to the respective first nodes MN0 to MNN according to the voltage level of the first bias signal VBIAS1. For example, the first driving units MD0 to MSN may include PMOS transistors having gates which are coupled to the input terminal of the first bias signal VBIAS1 and sources and drains which are coupled between the terminal of the high voltage and the respective first nodes MN0 to MNN.

The first switching units MSW0 to MSWN may be coupled between the first nodes MN0 to MNN and the output terminal of the ramp voltage VRAMP. The first switching units MSW0 to MSWN may be sequentially switched in each predetermined cycle in response to the first ramp control signals VCR_CTRL<0:N>. For example, all of the first switching units MSW0 to MSWN may be shorted during a first cycle, N number of first switching units MSW1 to MSWN may be shorted and only the remaining first switching unit MSW0 may be opened during a second cycle. Further, only one first switching unit MSWN may be shorted and the remaining N number of first switching units MSW0 to MSWN−1 may be opened during a last (N+1)th cycle.

The first resistance unit R may be coupled between the output terminal of the ramp voltage VRAMP and the terminal of a low voltage.

The ramp voltage correction block 250 may include a plurality of second driving units SD0 to SDM, a plurality of second switching units SSW0 to SSWM, and a plurality of second complementary switching units SSWB0 to SSWBM.

The second complementary switching units SSWB0 to SSWBM may be components for correcting the ramp bar voltage VRAMPB. Hereinafter, for the sake of convenience, descriptions for the second complementary switching units SSWB0 to SSWBM will be omitted, and descriptions will be made for only the second driving units SD0 to SDM and the second switching units SSW0 to SSWM.

The second driving units SD0 to SDM may drive a plurality of second nodes SN0 to SNM with the high voltage in response to the second bias signal VBIAS2. The second driving units SD0 to SDM may provide constant unit sub current regardless of the analog gain to the respective second nodes SN0 to SNM according to the constant voltage level of the second bias signal VBIAS2. For example, the second driving units SD0 to SDM may include PMOS transistors having gates which are coupled to the input terminal of the second bias signal VBIAS2 and sources and drains which are coupled between the terminal of the high voltage and the respective second nodes SN0 to SNM.

The second switching units SSW0 to SSWM may be coupled between the second nodes SN0 to SNM and the output terminal of the ramp voltage VRAMP. The second switching units SSW0 to SSWM may be switched with a specific state during the initial period in each predetermined cycle in response to the second ramp control signals EMP_CTRL<0:M>. For example, some of the second switching units SSW0 to SSWM may be opened during the initial period in each predetermined cycle, and the remainder of the second switching units SSW0 to SSWM may be continuously shorted in each predetermined cycle. The number of switching units to be opened among the second switching units SSW0 to SSWM may be controlled to be inversely proportional to the analog gain.

Figure 10:
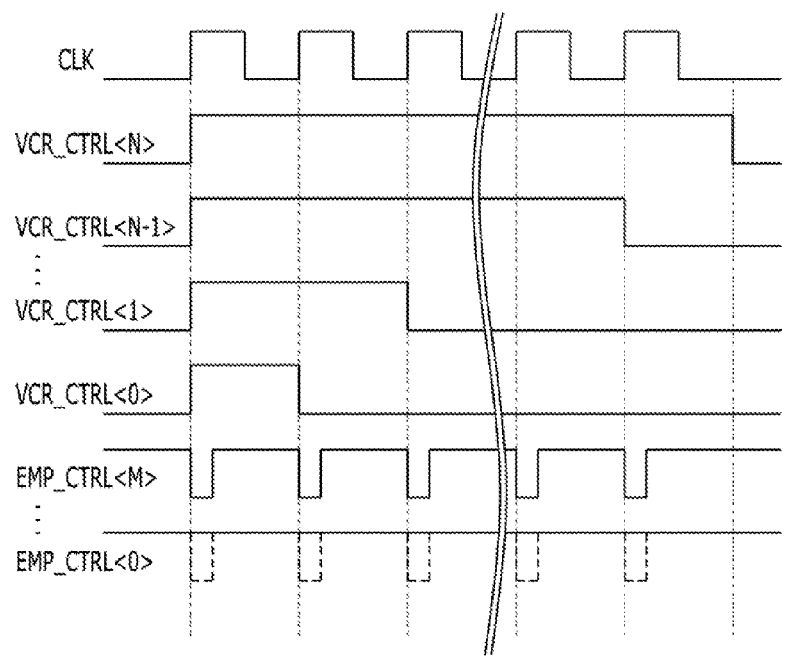
FIG. 10 is a timing diagram for describing an operation of the image sensing device shown in FIG. 7.

FIG. 10 is a timing diagram for describing an operation of the image sensing device 200 shown in FIG. 7.

Referring to FIG. 10, the first ramp voltage control block 220 may generate the first ramp control signal's VCR_CTRL<0:N> which are sequentially deactivated one by one in each predetermined cycle in response to the clock signal CLK. For example, the first ramp voltage control block 220 may activate all the first ramp control signals VCR_CTRL<0:N> during the first cycle of the clock signal CLK. Further, the first ramp voltage control block 220 may activate N number of first ramp control signals VCR_CTRL<1:N> among the first ramp control signals VCR_CTRL<0:N> and deactivate the remaining first ramp control signal VCR_CTRL<0> during the second cycle of the clock signal CLK. Lastly, the first ramp voltage control block 220 may activate one first ramp control signal VCR_CTRL<N> among the first ramp control signals VCR_CTRL<0:N> and deactivate the remaining N number of first ramp control signals VCR CTRL<0:N−1> during the (N+1)th cycle of the clock signal CLK.

The second ramp voltage control block 230 may generate the second ramp control signals EMP_CTRL<0:M> in response to the gain code B_CODE corresponding to the analog gain and the clock signal CLK. In detail, the switching control unit 231 may activate signals the number of which corresponds to the analog gain, among the switching control signals SW<0:M> in response to the gain code B_CODE. For example, the switching control unit 231 may control the number of signals to be activated among the switching control signals SW<0:M> to be inversely proportional to the analog gain. The control unit 233 may generate the second ramp control signals EMP_CTRL<0:M> in response to the switching control signals SW<0:M> and the clock signal CLK. For example, the control unit 233 may deactivate at least one among the second ramp control signals EMP_CTRL<0:M> during the initial period in each predetermined cycle, based on the analog gain.

While not shown in the drawings, the bias signal generation block 210 may generate the first bias signal VBIAS1 which is adjusted in the voltage level thereof in response to the gain code B_CODE. For example, the bias signal generation block 210 may generate the first bias signal VBIAS1 of a voltage level inversely proportional to the analog gain. Also, the bias signal generation block 210 may generate the second bias signal VBIAS2 which is fixed to a preselected voltage level, regardless of the analog gain.

Further, the ramp voltage generation block 240 may generate the ramp voltage VRAMP which falls by a predetermined voltage level in each predetermined cycle, in response to the first ramp control signals VCR_CTRL<0:N>. The ramp voltage generation block 240 may generate the ramp voltage VRAMP which falls by the predetermined voltage level inversely proportional to the analog gain, in response to the first bias signal VBIAS1. Namely, the ramp voltage generation block 240 may generate the ramp voltage VRAMP which has a slope inversely proportional to the analog gain.

The ramp voltage correction block 250 may correct the ramp voltage VRAMP in each predetermined cycle in response to the second ramp control signals EMP_CTRL<0:M>. For example, the ramp voltage correction block 250 may drive the output terminal of the ramp voltage VRAMP with a driving force that is less than in the other period, during the initial period in each predetermined cycle. The driving force may be controlled according to the number of switching units to be opened among the second switching units SSW0 to SSWM.

That is, the ramp voltage VRAMP may be generated by the ramp voltage generation block 240 in such a pattern that the ramp voltage VRAMP falls by the predetermined voltage level in each predetermined cycle. The ramp voltage VRAMP may be corrected additionally by the ramp voltage correction block 250 during the initial period in each predetermined cycle. Due to this fact, the settling time T2 (see FIG. 6) may be minimized when the ramp voltage VRAMP falls by the predetermined voltage level. In particular, since the ramp voltage VRAMP may be adjusted according to the number of switching units to be opened among the second switching units SSW0 to SSWM, the settling time T2 of the ramp voltage VRAMP may be kept constant even though the analog gain changes.

In an embodiment of the present invention, because a configuration in which the ramp voltage VRAMP falls was described as an example, by deactivating some or all of the second ramp control signals EMP_CTRL<0:M> during the initial period, the output terminal of the ramp voltage VRAMP may be driven with less driving force during the initial period. Conversely, in a configuration in which the ramp voltage VRAMP rises, by activating some or all of the second ramp control signals EMP_CTRL<0:M> during the initial period, the output terminal of the ramp voltage VRAMP may be driven with a greater driving force during the initial period. Accordingly, the second ramp control signals EMP_CTRL<0:M> in the configuration in which the ramp voltage VRAMP rises and the second ramp control signals EMP_CTRL<0:M> in the configuration in which the ramp voltage VRAMP falls should be designed to have opposite polarities.

Figure 11:
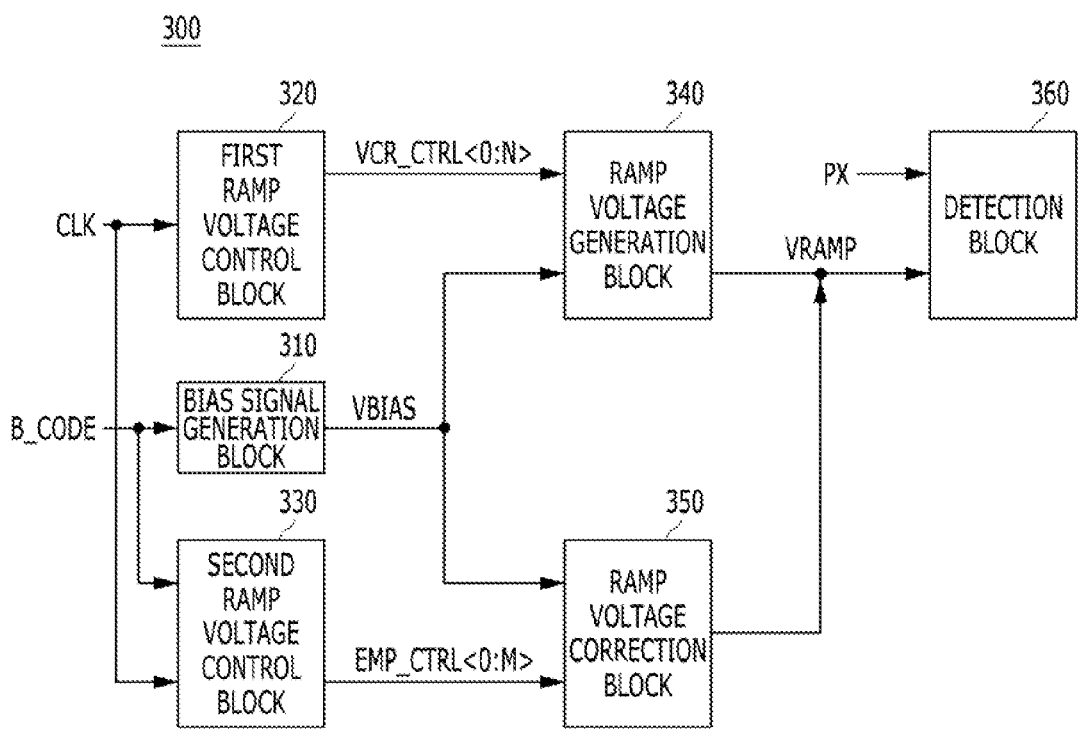
FIG. 11 is a block diagram illustrating an image sensing device in accordance with an embodiment of the present invention.

FIG. 11 is a block diagram illustrating an image sensing device 300 in accordance with an embodiment of the present invention.

Referring to FIG. 11, the image sensing device 300 may include a bias signal generation block 310, a first ramp voltage control block 320, a second ramp voltage control block 330, a ramp voltage generation block 340, a ramp voltage correction block 350, and a detection block 360.

Since the bias signal generation block 310, the first ramp voltage control block 320, the ramp voltage generation block 340, the ramp voltage correction block 350 and the detection block 360 have the same configurations as those 110, 120, 140, 150 and 160 described above in the embodiment of FIG. 2, detailed descriptions thereof will be omitted, and descriptions will be made below for only the second ramp voltage control block 330.

The second ramp voltage control block 330 may generate a plurality of second ramp control signals EMP_CTRL<0:M> in response to a gain code B_CODE corresponding to the analog gain and a clock signal CLK with a predetermined cycle. For example, the second ramp voltage control block 330 may deactivate at least one among the second ramp control signals EMP_CTRL<0:M> during an initial period in each predetermined cycle. In particular, the second ramp voltage control block 330 may control the deactivation period of at least one among the second ramp control signals EMP_CTRL<0:M>, based on the analog gain.

Figure 12:
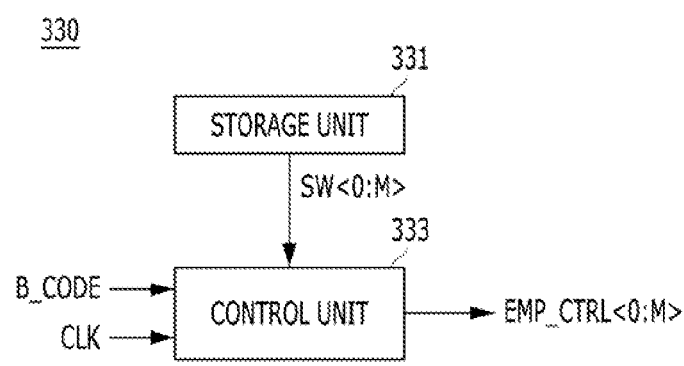
FIG. 12 is a detailed diagram of a second ramp voltage control block shown in FIG. 11.

FIG. 12 is a detailed diagram of the second ramp voltage control block 330 shown in FIG. 11.

Referring to FIG. 12, the second ramp voltage control block 330 may include a storage unit 331 and a control unit 333.

Since the storage unit 331 has the same configuration as that 131 described above in the embodiment of FIG. 3, descriptions will be made below for only the control unit 333.

The control unit 333 may generate the second ramp control signals EMP_CTRL<0:M> in response to the gain code B_CODE the dock signal CLK and a plurality of switching control signals SW<0:M>. For example, the control unit 333 may deactivate at least one among the second ramp control signals EMP_CTRL<0:M> during the initial period in each predetermined cycle. In particular, the control unit 333 may control the deactivation period of at least one among the second ramp control signals EMP_CTRL<0:M>, to be inversely proportional to the analog gain.

While it is illustrated as an example that a bias signal VBIAS is inputted to the ramp voltage correction block 350, it is to be noted that the embodiment is not limited to such an example and that a second bias signal VBIAS2 may be inputted to the ramp voltage correction block 350 as in the embodiment of FIG. 7.

In this embodiment of the present invention, descriptions will be made below for only configurations different from the embodiment of FIG. 2, that is, an operation corresponding to the second ramp voltage control block 300.

Figure 13:
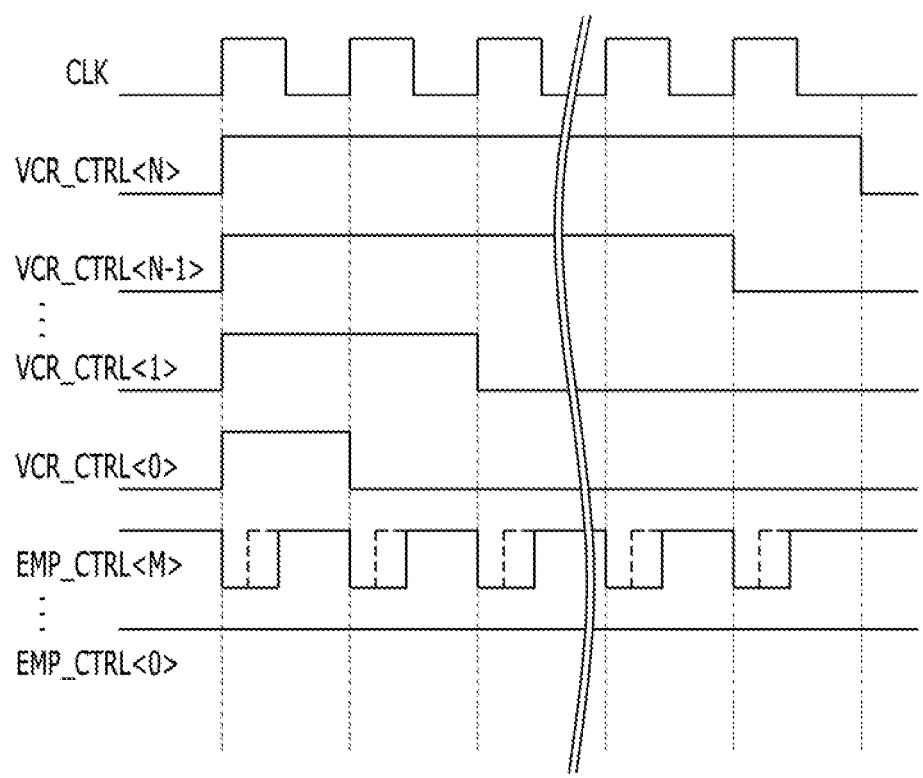
FIG. 13 is a timing diagram for describing an operation of the image sensing device shown in FIG. 11.

FIG. 13 is a timing diagram for describing an operation of the image sensing device 300 shown in FIG. 11.

Referring to FIG. 13, the second ramp voltage control block 330 may generate the second ramp control signals EMP_CTRL<0:M> in response to the clock signal CLK. For example, the control unit 333 may deactivate one second ramp control signal EMP_CTRL<M> among the second ramp control signals EMP_CTRL<0:M> during the initial period in each predetermined cycle and continuously activate the remaining second ramp control signals EMP_CTRL<0:M-1> among the second ramp control signals EMP_CTRL<0:M>, in response to the switching control signals SW<0:M> and the clock signal CLK. In particular, the control unit 333 may control the deactivation period of the second ramp control signal EMP_CTRL<M> deactivated among the second ramp control signals EMP_CTRL<0:M> in response to the gain code B_CODE. The control unit 333 may control the deactivation period to be inversely proportional to the analog gain.

The ramp voltage correction block 350 may correct a ramp voltage VRAMP during the initial period in each predetermined cycle in response to the second ramp control signals EMP_CTRL<0:M>. For example, the ramp voltage correction block 350 may drive the output terminal of the ramp voltage VRAMP with a driving force that is less than in the other period, during the initial period in each predetermined cycle. The driving force may be controlled according to the voltage level of the bias signal VBIAS and/or the deactivation period of the second ramp control signals EMP_CTRL<0:M>.

That is, the ramp voltage VRAMP may be generated by the ramp voltage generation block 340 in such a pattern that the ramp voltage VRAMP falls by a predetermined voltage level in each predetermined cycle. The ramp voltage VRAMP may be corrected additionally by the ramp voltage correction block 350 during the initial period in each predetermined cycle. Due to this fact, settling time T2 (see FIG. 6) may be minimized when the ramp voltage VRAMP falls by the predetermined voltage level. In particular, since the ramp voltage VRAMP may be adjusted according to the voltage level of the bias signal VBIAS and/or the deactivation period of the second ramp control signals EMP_CTRL<0:M>, the settling time T2 of the ramp voltage VRAMP may be kept constant even though the analog gain changes.

In this embodiment of the present invention, because a configuration in which the ramp voltage VRAMP falls was described as an example, by deactivating some or all of the second ramp control signals EMP_CTRL<0:M> during the initial period, the output terminal of the ramp voltage VRAMP may be driven with less driving force during the initial period. Conversely, in a configuration in which the ramp voltage VRAMP rises, by activating some or all of the second ramp control signals EMP_CTRL<0:M> during the initial period, the output terminal of the ramp voltage VRAMP may be driven with greater driving force during the initial period. Accordingly, the second ramp control signals EMP_CTRL<0:M> in the configuration in which the ramp voltage VRAMP rises and the second ramp control signals EMP_CTRL<0:M> in the configuration in which the ramp voltage VRAMP falls should be designed to have opposite polarities.

As is apparent from the above descriptions, according to the embodiments, advantages are provided in that, since a ramp voltage may be generated with a relatively short settling time, the voltage level of a pixel signal may be stably detected.

Although various embodiments have been described for illustrative purposes, it will be apparent to those skilled in the art that various changes and modifications may be made without departing from the spirit and scope of the invention as defined in the following claims.

What is claimed is:

1. An image sensing device comprising:
   a ramp voltage generation block suitable for generating a ramp voltage adjusted by a predetermined voltage in each predetermined cycle, based on a bias signal and a plurality of first ramp control signals; and
   a ramp voltage correction block suitable for correcting the ramp voltage in each predetermined cycle based on the bias signal and at least one second ramp control signal.

2. The image sensing device according to claim 1, wherein the ramp voltage correction block drives an output terminal of the ramp voltage with a driving force corresponding to the bias signal during an initial period in each predetermined cycle.

3. The image sensing device according to claim 1, further comprising:
   a detection block suitable for detecting a voltage of a pixel signal based on the ramp voltage; and
   a bias signal generation block suitable for generating the bias signal, and adjusting a voltage of the bias signal based on a gain code corresponding to an analog gain.

4. The image sensing device according to claim 1, wherein the ramp voltage generation block comprises:
   a plurality of first driving units suitable for driving a plurality of first nodes with high voltage based on the bias signal;
   a plurality of first switching units coupled between the first nodes and an output terminal of the ramp voltage, and suitable for being sequentially switched in each predetermined cycle based on the first ramp control signals; and
   a resistance unit coupled between the output terminal of the ramp voltage and a low voltage terminal.

5. The image sensing device according to claim 4, wherein the ramp voltage correction block comprises:
   at least one second driving unit suitable for driving at least one second node with high voltage based on the bias signal; and
   at least one second switching unit coupled between the at least one second node and the output terminal of the ramp voltage, and suitable for being switched with a specific state in each predetermined cycle based on the at least one second ramp control signal.

6. The image sensing device according to claim 5, further comprising:
   a first ramp voltage control block suitable for generating the first ramp control signals based on a clock signal with the predetermined cycle; and
   a second ramp voltage control block suitable for generating the at east one second ramp control signal based on the clock signal.

7. The image sensing device according to claim 6, wherein the second ramp voltage control block comprises:
   a storage unit suitable for storing a switching control signal for controlling whether to switch the at least one second switching unit; and
   a control unit suitable for generating the at least one second ramp control signal which is activated or deactivated during only the initial period in each predetermined cycle, based on the clock signal and the switching control signal.

8. An image sensing device comprising:
   a detection block suitable for detecting a voltage of a pixel signal based on a ramp voltage;
   a bias signal generation block suitable for generating a first bias signal, and a second bias signal, wherein the first bias signal has a voltage adjusted based on a gain code corresponding to an analog gain, and the second bias signal has a constant voltage regardless of the gain code;
   a first ramp voltage control block suitable for generating a plurality of first ramp control signals based on a clock signal with a predetermined cycle;
   a second ramp voltage control block suitable for generating a plurality of second ramp control signals based on the gain code and the dock signal;
   a ramp voltage generation block suitable for generating the ramp voltage having a voltage adjusted by a predetermined voltage in each predetermined cycle, based on the first bias signal and the first ramp control signals; and
   a ramp voltage correction block suitable for correcting the ramp voltage in each predetermined cycle based on the second bias signal and the second ramp control signals.

9. The image sensing device according to claim 8, wherein the second ramp voltage control block activates some or all of the second ramp control signals during only an initial period in each predetermined cycle based on the gain code and the clock signal.

10. The image sensing device according to claim 8, wherein the ramp voltage correction block drives an output terminal of the ramp voltage with a predetermined driving force during the initial period in each predetermined cycle.

11. The image sensing device according to claim 8, wherein the ramp voltage generation block comprises:
    a plurality of first driving units suitable for driving a plurality of first nodes with high voltage based on the first bias signal;
    a plurality of first switching units coupled between the first nodes and an output terminal of the ramp voltage, and suitable for being sequentially switched in each predetermined cycle based on the first ramp control signals; and
    a resistance unit coupled between the output terminal of the ramp voltage and a low voltage terminal.

12. The image sensing device according to claim 11, wherein the ramp voltage correction block comprises:

a plurality of second driving units suitable for driving a plurality of second nodes with high voltage based on the second bias signal; and a plurality of second switching units coupled between the second nodes and the output terminal of the ramp voltage, and suitable for being variously switched according to the analog gain, based on the second ramp control signals.

13. The image sensing device according to claim 12, wherein the second switching units are switched according to the analog gain, and, according to such switching, some or all of the second switching units are switched with a specific state in each predetermined cycle.

14. The image sensing device according to claim 12, wherein the second amp voltage control block comprises:
 a switching control unit suitable for generating switching control signals for controlling whether to switch the second switching units, based on the gain code; and
 a control unit suitable for activating some or all of the second ramp control signals during only the initial period in each predetermined cycle, based on the clock signal and the switching control signals.

15. An image sensing device comprising:
 a detection block suitable for detecting a voltage of a pixel signal based on a ramp voltage;
 a bias signal generation block suitable for generating a bias signal having a voltage adjusted based on a gain code corresponding to an analog gain;
 a first ramp voltage control block suitable for generating a plurality of first ramp control signals based on a clock signal with a predetermined cycle;
 a second ramp voltage control block suitable for generating at least one second ramp control signal which is activated or deactivated during only an initial period in each predetermined cycle, based on the clock signal, and controlling a pulse width of the at least one second ramp control signal based on the gain code;
 a ramp voltage generation block suitable for generating the ramp voltage that is adjusted by a predetermined voltage in each predetermined cycle, based on the bias signal and the first ramp control signals; and
 a ramp voltage correction block suitable for correcting the ramp voltage in each predetermined cycle based on the bias signal and the at least one second ramp control signal.

16. The image sensing device according to claim 15, wherein the ramp voltage correction block drives an output terminal of the ramp voltage with a predetermined driving force during the initial period in each predetermined cycle.

17. The image sensing device according to claim 15, wherein the ramp voltage generation block comprises:
 a plurality of first driving units suitable for driving a plurality of first nodes with high voltage based on the bias signal;
 a plurality of first switching units coupled between the first nodes and an output terminal of the ramp voltage, and suitable for being sequentially switched in each predetermined cycle based on the first ramp control signals; and
 a resistance unit coupled between the output terminal of the ramp voltage and a low voltage terminal.

18. The image sensing device according to claim 17, wherein the ramp voltage correction block comprises:
 at least one second driving unit suitable for driving at least one second node with high voltage based on the bias signal; and
 at least one second switching unit coupled between the at least one second node and the output terminal of the ramp voltage, and suitable for being switched with a specific state in each predetermined cycle based on the at least one second ramp control signal.

19. The image sensing device according to claim 18, wherein the second ramp voltage control block comprises:
 a storage unit suitable for storing a switching control signal for controlling whether to switch the at least one second switching unit; and
 a control unit suitable for generating the at least one second ramp control signal which is activated or deactivated during only the initial period in each predetermined cycle, based on the clock signal and the switching control signal, and controlling a pulse width of the at least one second ramp control signal based on the gain code.

* * * * *